(12) United States Patent
MacLellan et al.

(10) Patent No.: US 8,856,312 B2
(45) Date of Patent: Oct. 7, 2014

(54) METHOD AND SYSTEM FOR MONITORING TRANSACTION BASED SYSTEM

(75) Inventors: Scot MacLellan, Rome (IT); Vincenzo Sciacca, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1760 days.

(21) Appl. No.: 11/722,583

(22) PCT Filed: Oct. 26, 2005

(86) PCT No.: PCT/EP2005/055580
§ 371 (c)(1),
(2), (4) Date: Jun. 22, 2007

(87) PCT Pub. No.: WO2006/066990
PCT Pub. Date: Jun. 29, 2006

(65) Prior Publication Data
US 2008/0097801 A1    Apr. 24, 2008

(30) Foreign Application Priority Data
Dec. 24, 2004  (EP) .................................... 04300953

(51) Int. Cl.
*G06F 15/173*  (2006.01)
*G06F 11/34*  (2006.01)
(52) U.S. Cl.
CPC ...... *G06F 11/3409* (2013.01); *G06F 2201/865* (2013.01); *G06F 2201/87* (2013.01); *G06F 2201/81* (2013.01); *G06F 2201/86* (2013.01); *G06F 11/3495* (2013.01)
USPC ......................................................... 709/224
(58) Field of Classification Search
CPC .................................................. G06F 11/3409
USPC ................. 709/224, 217, 223, 220; 705/7, 11
See application file for complete search history.

(56) References Cited

U.S. PATENT DOCUMENTS

| | | | |
|---|---|---|---|
| 2002/0099578 A1* | 7/2002 | Eicher et al. | ...................... 705/7 |
| 2002/0198985 A1 | 12/2002 | Fraenkel et al. | |
| 2003/0079160 A1* | 4/2003 | McGee et al. | .................. 714/39 |
| 2004/0073641 A1 | 4/2004 | Minhazuddin | |

(Continued)

FOREIGN PATENT DOCUMENTS

| | | |
|---|---|---|
| JP | 9244998 A | 9/1997 |
| JP | 2003263342 A | 9/2003 |

(Continued)

OTHER PUBLICATIONS

Correlating Resource Demand Information with ARM Data for Application Services Jerome Roli and vidar Etland, Carlton University Department of Systems and computer Engineering Ottawa, Ontario, Canada KIS 5B6, pp. 219-230, XP-000846877, 1998.

(Continued)

*Primary Examiner* — Peter Shaw
(74) *Attorney, Agent, or Firm* — Garg Law Firm, PLLC; Rakesh Garg; Parashos Kalaitzis

(57) ABSTRACT

A method for monitoring transaction based systems monitoring their system resource and transaction performance data with thresholds on metrics, said method comprising the steps of collecting system resource data and transaction performance data on a period basis and each time a transaction performance metric is passed, triggering the collection of the system resource and storing an identifier correlating the transaction performance data and the system resource data; merging the collected system resource and transaction performance data; calculating the mean value for each system resource or transaction performance metric of merged data; identifying the metrics for which there is a significant difference between mean value obtained with triggering or without triggering; according to the identified metric mean value, calculating new thresholds of system resource metrics to be used for monitoring.

12 Claims, 11 Drawing Sheets

(56) References Cited

U.S. PATENT DOCUMENTS

2004/0075690 A1*  4/2004  Cirne ............................ 345/771
2006/0188011 A1*  8/2006  Goldszmidt et al. .......... 375/229

FOREIGN PATENT DOCUMENTS

| TW | 480394 B | 3/2002 |
| WO | 03005279 A | 1/2003 |
| WO | 03009140 A | 1/2003 |

OTHER PUBLICATIONS

Taiwan Patent Office, Office action dated May 3, 2011—Original Taiwanese and English translation enclosed.

* cited by examiner

| Timestamp | Transaction Response time | CPU % | Available memory (K) |
|---|---|---|---|
| 12:00:00 | 0.25 | 48 | 304473 |
| 12:01:00 | 0.3 | 62 | 267594 |
| 12:02:00 | 0.27 | 55 | 287309 |
| 12:03:00 | 0.26 | 58 | 298305 |
| 12:04:00 | 0.31 | 65 | 276811 |
| 12:05:00 | 0.24 | 74 | 349277 |
| 12:06:00 | 0.26 | 80 | 298347 |
| 12:07:00 | 0.25 | 76 | 295038 |
| 12:08:00 | 0.27 | 63 | 286602 |
| 12:09:00 | 0.24 | 59 | 300219 |
| 12:10:00 | 0.27 | 61 | 294117 |
| 12:11:00 | 0.3 | 75 | 280499 |
| 12:12:00 | 0.25 | 77 | 282991 |
| 12:13:00 | 0.23 | 54 | 329832 |
| 12:14:00 | 0.25 | 48 | 315830 |
| 12:15:00 | 0.27 | 60 | 294381 |
| 12:16:00 | 0.24 | 78 | 319982 |
| 12:17:00 | 0.3 | 84 | 278455 |
| 12:18:00 | 0.29 | 83 | 288201 |
| 12:19:00 | 0.27 | 76 | 290006 |
| 12:20:00 | 0.26 | 69 | 303395 |

Fig. 3

| Timestamp | Transaction Response time | CPU % | Available memory (K) |
|---|---|---|---|
| 12:00:00 | 0.25 | 48 | 304473 |
| 12:01:00 | 0.3 | 62 | 267594 |
| 12:02:00 | 0.27 | 55 | 287309 |
| 12:03:00 | 0.26 | 58 | 298305 |
| 12:03:17 | 1.27 | | |
| 12:04:00 | 0.31 | 65 | 276811 |
| 12:05:00 | 0.24 | 74 | 349277 |
| 12:06:00 | 0.26 | 80 | 298347 |
| 12:07:00 | 0.25 | 76 | 295038 |
| 12:08:00 | 0.27 | 63 | 286602 |
| 12:09:00 | 0.24 | 59 | 300219 |
| 12:10:00 | 0.27 | 61 | 294117 |
| 12:11:00 | 0.3 | 75 | 280499 |
| 12:12:00 | 0.25 | 77 | 282991 |
| 12:13:00 | 0.23 | 54 | 329832 |
| 12:13:35 | 1.19 | | |
| 12:14:00 | 0.25 | 48 | 315830 |
| 12:15:00 | 0.27 | 60 | 294381 |
| 12:16:00 | 0.24 | 78 | 319982 |
| 12:17:00 | 0.3 | 84 | 278455 |
| 12:18:00 | 0.29 | 83 | 288201 |
| 12:19:00 | 0.27 | 76 | 290006 |
| 12:20:00 | 0.26 | 69 | 303395 |

*Fig. 4*

| Timestamp | Transaction Response time | CPU % | Available memory (K) |
|---|---|---|---|
| 12:00:00 | 0.25 | 48 | 304473 |
| 12:01:00 | 0.3 | 62 | 267594 |
| 12:02:00 | 0.27 | 55 | 287309 |
| 12:03:00 | 0.26 | 58 | 298305 |
| 12:03:17 | 1.27 | 62 | 12729 |
| 12:04:00 | 0.31 | 65 | 276811 |
| 12:05:00 | 0.24 | 74 | 349277 |
| 12:06:00 | 0.26 | 80 | 298347 |
| 12:07:00 | 0.25 | 76 | 295038 |
| 12:08:00 | 0.27 | 63 | 286602 |
| 12:09:00 | 0.24 | 59 | 300219 |
| 12:10:00 | 0.27 | 61 | 294117 |
| 12:11:00 | 0.3 | 75 | 280499 |
| 12:12:00 | 0.25 | 77 | 282991 |
| 12:13:00 | 0.23 | 54 | 329832 |
| 12:13:35 | 1.19 | 59 | 15924 |
| 12:14:00 | 0.25 | 48 | 315830 |
| 12:15:00 | 0.27 | 60 | 294381 |
| 12:16:00 | 0.24 | 78 | 319982 |
| 12:17:00 | 0.3 | 84 | 278455 |
| 12:18:00 | 0.29 | 83 | 288201 |
| 12:19:00 | 0.27 | 76 | 290006 |
| 12:20:00 | 0.26 | 69 | 303395 |

Fig. 6

| Record number | Timestamp | Correlator | Metric A | Metric B | Metric C | Metric D | Metric E |
|---|---|---|---|---|---|---|---|
| 1 | 12:00:00 | | 10.1 | 707 | 20 | 80 | 0.39 |
| 2 | 12:01:00 | | 9.8 | 732 | 21 | 90 | 0.42 |
| 3 | 12:01:48 | xyz123 | 43.7 | 722 | 6 | 604 | 0.40 |
| 4 | 12:02:00 | | 9.7 | 705 | 22 | 85 | 0.41 |
| 5 | 12:03:00 | | 9.9 | 724 | 23 | 85 | 0.39 |
| 6 | 12:04:00 | | 10.2 | 716 | 20 | 89 | 0.37 |
| 7 | 12:05:00 | | 10.0 | 719 | 20 | 84 | 0.44 |
| 8 | 12:05:23 | xyz124 | 63.5 | 720 | 6 | 566 | 0.38 |
| 9 | 12:06:00 | | 9.9 | 714 | 19 | 83 | 0.40 |
| 10 | 12:07:00 | | 9.9 | 730 | 23 | 78 | 0.43 |
| 11 | 12:08:00 | | 10.1 | 721 | 24 | 87 | 0.38 |
| 12 | 12:09:00 | | 9.8 | 709 | 23 | 86 | 0.40 |
| 13 | 12:09:16 | xyz125 | 50.1 | 702 | 5 | 597 | 0.39 |
| 14 | 12:10:00 | | 9.9 | 720 | 21 | 84 | 0.37 |
| Average for records with correlator | | | 52.4 | 715 | 6 | 589 | 0.39 |
| Average for records without correlator | | | 9.9 | 718 | 21 | 85 | 0.40 |

*Fig. 7*

METHOD AND SYSTEM FOR MONITORING TRANSACTION BASED SYSTEM

FIELD OF THE INVENTION

The present invention generally relates to system performance, more particularly this invention relates to a method and system for automatically deriving symptom signatures from problems that affect transaction performance.

BACKGROUND OF THE INVENTION

The most important thing when running a business using IT resources is that the system provides the function required to support the business applications at a level of service that renders it efficient. This requires that the transactions are executed in a timely fashion. Typically, when a transaction response time problem occurs, it is experienced by end users first, and IT staff are alerted to the problem after it has already impacted the business. The process of trouble shooting then begins, and the IT resources are examined to discover where the problem lies.

Sophisticated transaction monitoring tools exist, that alert IT staff in real time as soon as transaction response times exceed pre-defined thresholds. This is a major improvement to the typical (previous) scenario, but these tools are not yet prevalent, and there are implications in using these tools. For instance, applications need to be instrumented to call transaction monitor tools for timing the duration of a transaction, and this instrumentation adds to the pathlength of the transaction itself, and therefore slows down the transaction execution. It would be preferable if degraded response time could be detected without using methods that directly impact the execution of the transaction itself.

In a commercial business application, when transactions fail to complete, or are extremely slow, there is invariably a problem with one or more of the IT resources that support the business application (e.g. database, file system, server). Problems in the IT resources that result in the degradation of transaction response time are finite and repeatable. Being able to recognize the conditions that result in service degradation by observing the state of the IT resources would allow for a rapid reaction to problem situations without necessitating a widespread deployment of transaction monitoring and avoiding the pathlength overhead that such monitoring implies.

In the monitoring space of systems management, there are two distinct categories of monitoring: resource monitoring and transaction monitoring. Different techniques are applied to monitor the state and behavior of IT resources than are used to monitor transaction execution performance, and the two disciplines are implemented with different tools and practices. Therefore, although an administrator can have information about the performance of transactions running in the system, and information about how the various IT resources are behaving, it is extremely difficult to put the two together and leverage both sets of data to identify the root cause of observed problems. Thus it is not possible to identify problems that result in poor transaction performance with resource monitoring only.

When looking for existing methods for improving response time of transactions, one can be found on the Web pages of the Microsoft (Microsoft is a trademark of Microsoft Corporation in certain countries) site at the following address: Http://www.microsoft.com/technet/prodtechnol/sscomm/reskit/rkcapmit.mspx
These pages describe a capacity model for Internet transactions. This method attempts to improve transaction performance by measuring system monitoring parameters to create predictive static curves of resource consumption. Then, transaction response time and throughput are given as input to the model which predicts system resource consumption. If this methods of capacity planning helps in sizing systems for supporting transactions, it does not helps in monitoring, in real time, transaction performances.

SUMMARY OF THE INVENTION

The present invention provides a monitoring transaction based system having a system resource monitor and a transaction performance monitor. These monitors periodically collect respectively system resource metrics values and transaction performance metrics values on a time period basis. These monitors also detect when system resource or transaction performance metrics threshold values are exceeded. The transaction performance monitor triggers the system resource monitor for additionally collecting system resource metrics values each time a transaction performance metric threshold value is exceeded, outside of a time period normally used for collecting. The mean value of each periodically collected system resource metrics values is calculated for a number of time periods, as well as, for the same number of time periods, the mean value of each additionally collected system resource metrics values. The system resource metrics are identified for which there is a significant difference between mean value obtained with additional collections of system resource metrics values and mean value obtained with collections of system resource metrics values done on period of time basis. New threshold values are set between the two calculated mean values for the identified system resource metrics.

BRIEF DESCRIPTION OF THE DRAWINGS

FIG. 3 shows the measurement results as stored in the Monitoring Database when TP and RM databases are merged;

FIG. 4 shows two incomplete measurements in measurement results of the Monitoring Database if the Triggering with Correlator of the method of the preferred embodiment is not used;

FIG. 6 shows the measurement results as stored in the Monitoring Database when TP and RM databases are merged and when the Triggering with Correlator is used according to the method of the preferred embodiment;

FIG. 7 shows the measurement results as stored in the Monitoring Database according to the preferred embodiment from which are extracted the problem signatures;

DETAILED DESCRIPTION OF THE PREFERRED EMBODIMENT

Figure 1:
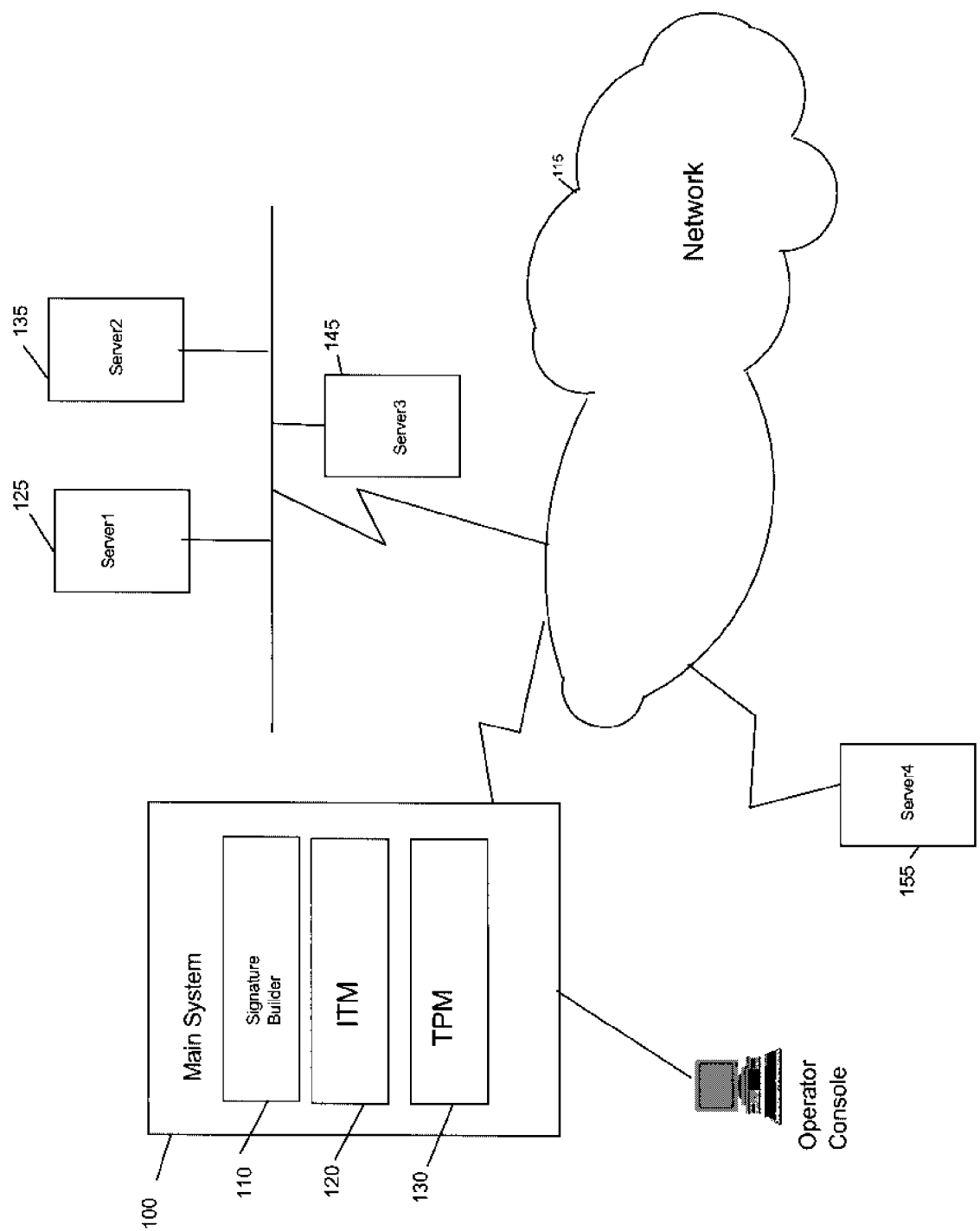
FIG. 1 illustrates the overview of the computing system for operating the method according to the preferred embodiment.

FIG. 1 illustrates the environment of the method of the invention according to the preferred embodiment. A main system (100) is in connection to servers (155, 125, 135, 145) which can form a Local Area Network (125, 135, 145) through a network (115). The Main system monitors the system resources of itself and the transaction performance as a central point for the servers. In the preferred embodiment the software tools installed on the Main System IBM Tivoli Monitor (ITM) (120) and the IBM Tivoli Transaction Performance Monitor (130), to respectively monitor the Information Technology (IT) system resources and the transaction performance. It is noted that any other tool for monitoring system resources (also called RM or System Resource Monitor or Resource Monitor) or for measuring transaction performance can be used for implementing the invention. The Signature Builder (110) software layer also operating on the Main System includes the new functions of the preferred embodiment of the invention. An operator console is connected to the main system for manual monitoring operations.

Figure 2:
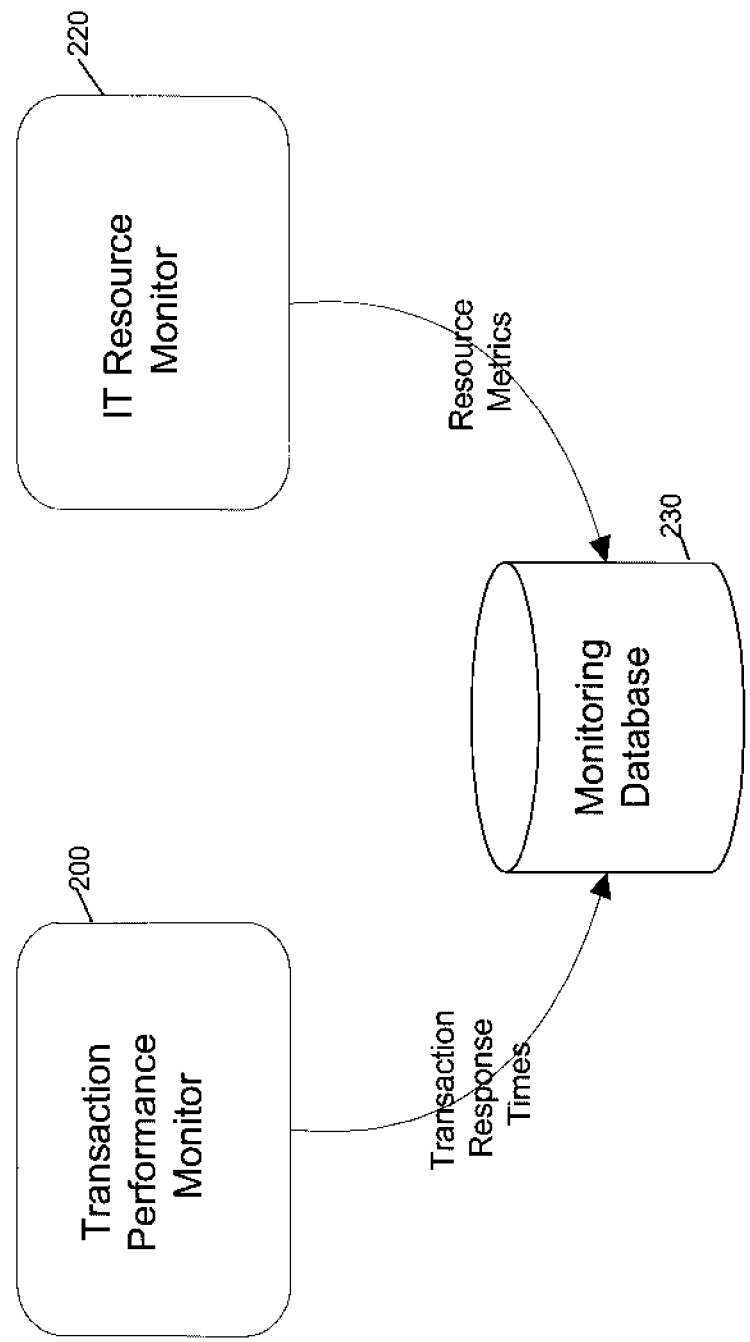
FIG. 2 illustrates the TP and RM database merging, one aspect of the method of the preferred embodiment.

FIG. 2 illustrates the TP and RM database merging, one aspect of the method of the preferred embodiment. FIG. 2 shows a combined transaction performance (200) and resource monitor (220). The Transaction Performance Monitor (200) which could be the IBM Tivoli Monitor of FIG. 1 (130) is gathering transaction response times by one of the many methods used by TP products today. The IT Resource Monitor which could be the IBM Tivoli Monitor of FIG. 1 (120) is gathering metrics related to the availability and performance of IT resources using one of the many methods used by resource monitoring products today. The two entities are independently writing their data to a shared database (230). Data is being written on a periodic basis, for the sake of this example we will assume a monitoring cycle of 60 seconds.

FIG. 3 shows the measurement results as stored in the Monitoring Database when TP and RM databases are merged. In FIG. 3 erratic transaction performance is being observed, but as the IT Resource Monitor is collecting data on 60 second cycles, it is pure chance if resource metrics are collected at the same time as the transaction problems are being observed. Merging the information collected by the two entities may allow for a report that looks something like the following example. The example is deliberately oversimplified, and there are very few metrics shown. The report shown is also unrealistic, as it assumes time synchronization of the transaction performance and IT resource monitor data collection. In fact, today this is not achieved by any system but is added by the method for the preferred embodiment. For the purposes of clarity in the example however, synchronization is assumed.

FIG. 4 shows two incomplete measurements in measurement results of the Monitoring Database if the Triggering with Correlator of the method of the preferred embodiment is not used. As the transaction performance problems did not occur at a data collection point, there is no trace of any problem whatsoever in this report. It is noted that the transaction performance monitor may write records when a poor performance is observed, but without the corresponding resource data metrics, there is no indication of what is causing the problem. The measurement result report of FIG. 4 shows this scenario.

We see here that two problems have been observed, but as we have no resource metrics we are unable to draw any conclusions about what is responsible for the slow transaction performance.

Figure 5:
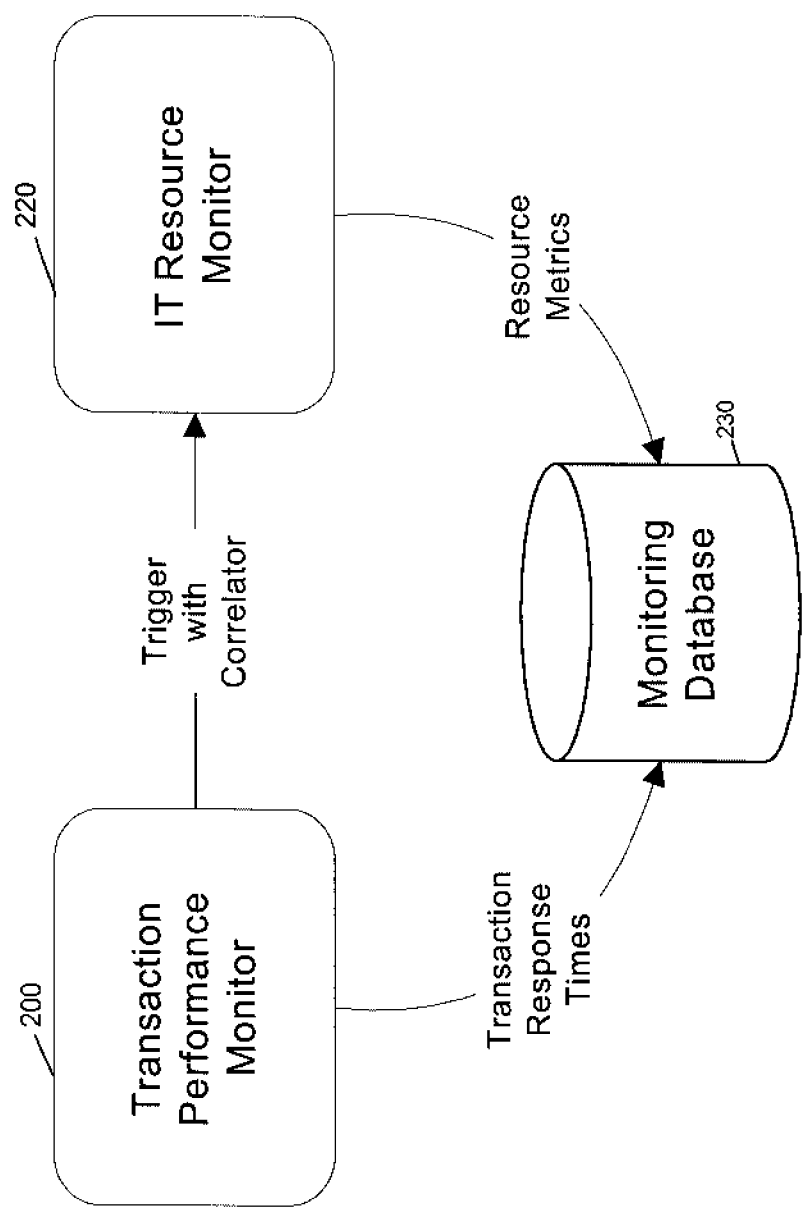
FIG. 5 illustrates the Triggering with Correlator function from the TP to the RM according to the method of the preferred embodiment.

FIG. 5 illustrates the Triggering with Correlator function from the TP to the RM according to the method of the preferred embodiment. The solution of the preferred embodiment adds the collaboration of the transaction performance and the IT resource monitoring entities to take a full snapshot of the situation at the moment in which a problem is observed.

In FIG. 5, the two monitoring entities are independently monitoring their domain of expertise, and are independently writing data to the shared database. When the transaction performance monitor observes a problem (response time exceeds a threshold), it triggers the IT resource monitor to collect data outside of its normal monitoring cycle. It also passes a correlator to the resource monitor to ensure that the transaction and the resource data can be pieced together, ensuring time synchronization. Thus with the method of the preferred embodiment the resource metrics that were missing from the previous report can be captured.

The method of the preferred embodiment adds the collaboration of the transaction performance and the IT resource monitoring entities to take a full snapshot of the situation at the moment in which a problem is observed. The two monitoring entities are independently monitoring their domain of expertise, and are independently writing data to the database (note that this database can be physically shared, or there can be two separate databases, one for transaction data and one for resource data, with the data being merged as a later step). When the transaction performance monitor observes a problem (response time exceeds a threshold), it triggers the IT resource monitor to collect data outside of its normal monitoring cycle. It also passes a correlator to the resource monitor to ensure that the transaction and the resource data can be pieced together, ensuring time synchronization.

For this triggering to work, the Resource Monitor must expose an interface to allow an external process to trigger the collection of data. This interface will expect a parameter in input, in order to have a correlator that enables the merging of the separate data records. The correlator is a unique identifier that represents the trigger condition, and is generated by the transaction monitor. In the simplest case, it can be an incrementing counter.

A complete measurement result report might look like as illustrated in FIG. 6. FIG. 6 shows the measurement results as stored in the Monitoring Database (230) when TP and RM databases are merged and when the Triggering with Correlator is used according to the method of the preferred embodiment.

Here we can see that when the transaction response time increases beyond acceptable levels, the amount of available memory is drastically reduced from the normal value when transactions are performing acceptably. We can also see that the CPU usage is normal, and therefore that CPU usage is not the cause of the problem but that low memory availability probably is. Being able to gather all of the relevant data at the right moment and being able to correlate the data from the different sources is key to identifying root causes of performance problems and is possible through the collaboration of the two monitoring components.

The following method is used to automatically determine which metric values are symptoms of a problem that adversely affects response time.

A record is produced for each collection interval. Each record contains the following information:
   a timestamp
   a list of key-value pairs, each representing a metric type and its observed value in that interval
   a correlator (will be null unless the collection was triggered by the Transaction Performance Monitor)

The mean value of each metric contained in records that have a non-null correlator value is calculated. Similarly, the mean value of each metric contained in records that have a null correlator value is calculated. The two are compared. If there is little difference between values of a metrics observed in exception conditions and in normal conditions then it is clear that the value of that particular metric is not a symptom of a problem that affects transaction response time. If there is a notable difference in a metric value in the two conditions, then it is probable that the metric can be used as a symptom of the problem that is slowing the response.

The above described method can be used to build a 'problem signature' that represents the state of a system when it is experiencing response time degradation, in terms of resource metrics and values. This is extremely useful, as then an IT Resource Monitor can detect situations that are likely causing response time problems, even if a transaction monitor is not installed and active on the system. Additionally, as transaction monitoring adds instructions into the transaction pathlengths, monitoring transaction response times implicitly slow down the transaction (albeit to a minor degree in well-implemented monitors) but detecting transaction response time problems without instrumenting the transaction path does not add any pathlength at all.

The problem signature will contain the metrics that show a notable difference in value between normal and exception states, and the values that they exhibit when in exception state. If the resource monitor detects that all of the metrics are exhibiting values that match their exception state levels, then it will report that the system is probably suffering degraded transaction response times. The values associated with each metric will not be the mean value calculated earlier. If that is used then, by definition, only half of the 'problem states' for an individual metric will be recognized, and even fewer of the overall problem signature. A better approach is to use a value midway between the mean for normal operating states and the mean for exception states, or some other point on the continuum between the two mean values. The exact point on that continuum is configurable but in the preferred embodiment is based on standard deviations from the mean values in exception states.

The example used in the figures described sooner in the document shows a single transaction executing on a single system where few performance metrics are collected. This is an extremely simple case. The method of the preferred embodiment applies also to business transactions that span multiple systems that are comprised of many sub-transactions.

A web user may invoke an operation that spawns sub-transactions on a web server, on a application server and on a database, for example. As the transaction monitor can tie together the sub-transactions through the use of a correlator, the same correlator can be used to relate resource monitor data on each individual system to the sub-transactions, and therefore also to the overall business transaction. Thus the method of the preferred embodiment can snapshot the resource behavior of all of the resources that support a business transaction across many systems, and highlight the cause of problems in complex situations.

An extension to the exceptional triggering of IT resource monitoring is to use the TP trigger mechanism to always trigger resource data collection in order that the correlator can always be passed to allow for the accurate join of the data from the respective components. This also has the benefit that the resource monitor can be instructed to collect the resource metrics as soon as the transaction monitor observes the start of a transaction. This means that the metric values accurately reflect the situation at the time that the transaction is being executed. In the previously described method, the metrics are collected after the transaction monitor has noticed a slow response time (i.e. after the transaction has completed). In most cases the short delay in gathering resource metrics will not affect the validity for the data, but in very dynamic environments the situation may change rapidly, and even the smallest of delays could render the pattern identification difficult.

FIG. 7 shows the measurement results as stored in the Monitoring Database (230) according to the preferred embodiment from which are extracted the problem signatures. The following example shows how the metrics whose values do not differ much between exception and non-exception state can be easily identified. In this case, metrics A, C and D have make up the problem signature whereas metric B and E do not provide any useful information regarding this problem.

Figure 8:
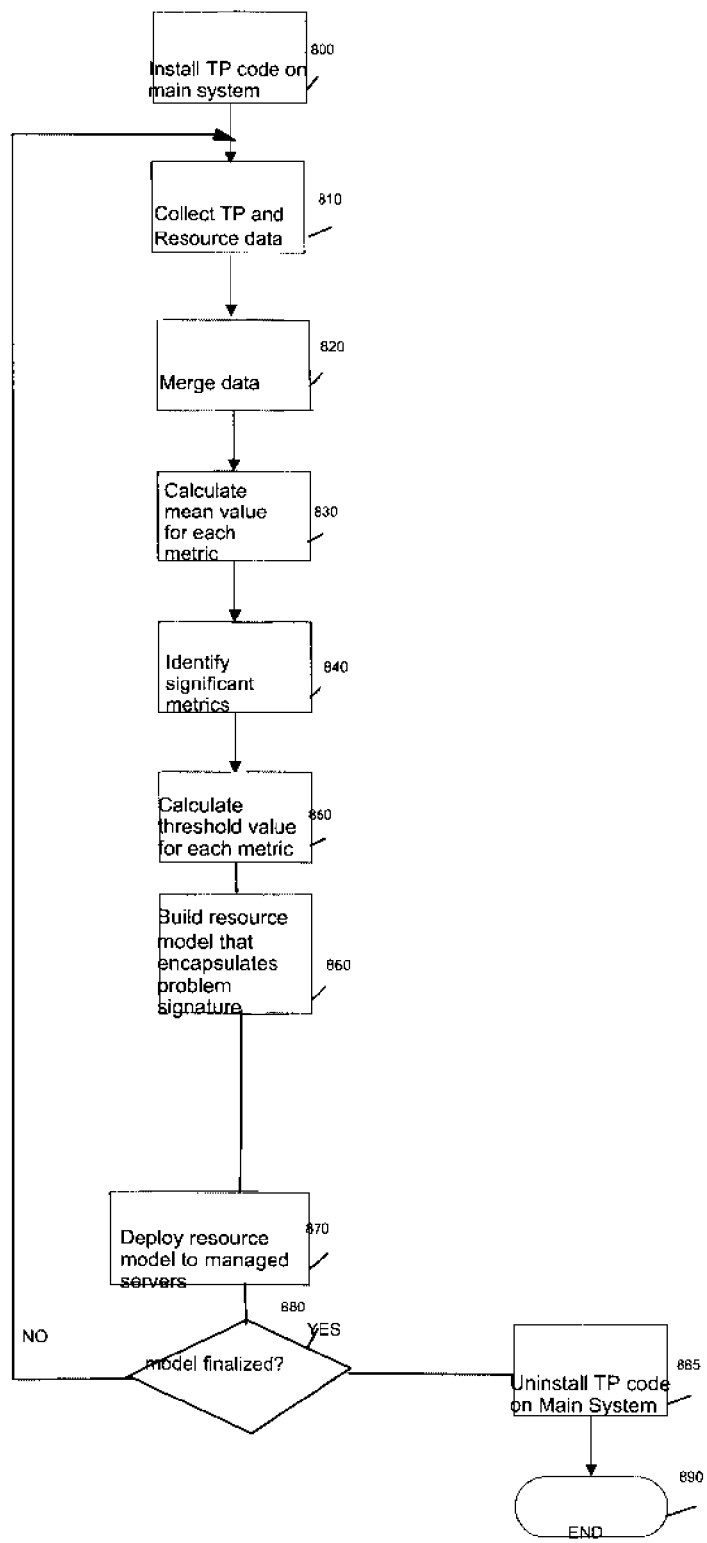
FIG. 8 is the general flow chart of the method according to the preferred embodiment.

FIG. 8 is the general flow chart of the method according to the preferred embodiment. The TP code (200) is installed (800) on the Main System on which already operates the IT resource Monitor (220) and signature builder (110) for monitoring the servers. Then, TP and RM data are collected (810) from monitored servers. The collected data are merged (820) in the Monitoring database. The Correlator contained in both the TP and RM records are used to correlate the related information. For each metric, the mean value is calculated (830). The significant metrics are identified. Metrics that are consistently different in 'normal' and 'exception' records are identified because they contribute to the problem signature. For each metric the threshold value is computed (850). The 'best' value is calculated using an arbitrarily algorithm or, alternatively, by allowing customer selection through the operator console. According to the preferred embodiment, a resource model that encapsulates problem signature is built (850). The Resource Model concept as described in this disclosure is a concept already applied in System Resource Monitors such as IBM Tivoli Monitoring (ITM). A Resource Model is a machine-readable package that describes the conditions that identify a particular situation. In the case of ITM, a simple RM contains an executable script that runs within ITM to collect the data (metrics) that is required to determine whether or not the system is in a state that matches the situation being monitored for, a number of thresholds against which to compare the metric values, and some Boolean logic that combines the results of the comparisons to identify combinations that represent the situation being monitored for. ITM RMs can execute more complicated logic, but for the purposes of this method a Resource Model represents a machine-readable package that is consumed by System Resource Monitor and which enables it to identify a particular system situation.

The resource model is then deployed (870) to the managed servers. If a longer period of training is needed to identify problems, the data is collected again and the same loop is performed. If the user has no more need of this service, this is the end of the method. Training can be carried out for a certain period of time and then (answer Yes to test 880), the TP code is removed (885) and the signatures produced are used by the resource monitoring tool. Alternatively (answer No to test 880), training can be ongoing and the signatures are continually updated with recent data. This latter approach is appropriate if a TP agent can be left active on the system.

Figure 9:
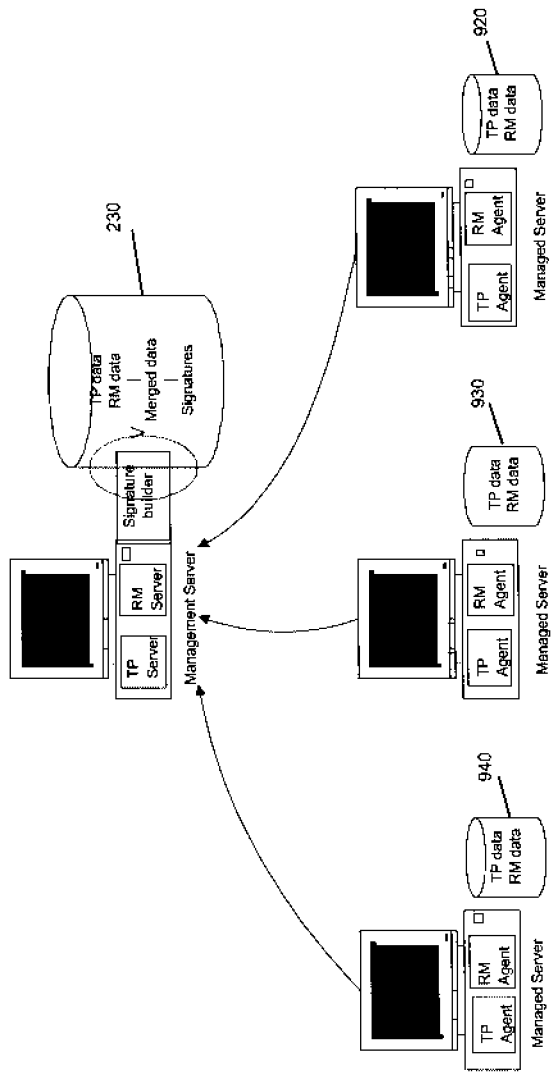
FIG. 9 illustrates a system environment for operating the method of the preferred embodiment during the training period.

FIG. 9 illustrates a system environment for operating the method of the preferred embodiment during the training period. This FIG. 9 shows the TP and RM agents collecting data on independent databases (940, 930, 920) and sending it to their respective management server components. In this configuration, both agents run on all managed servers until the training period is over. Once the records are persisted in the database, the new logic merges the records in the Monitoring database (230) and builds the signatures. The signatures will be deployed to the RM agents once the training period is over.

Figure 10:
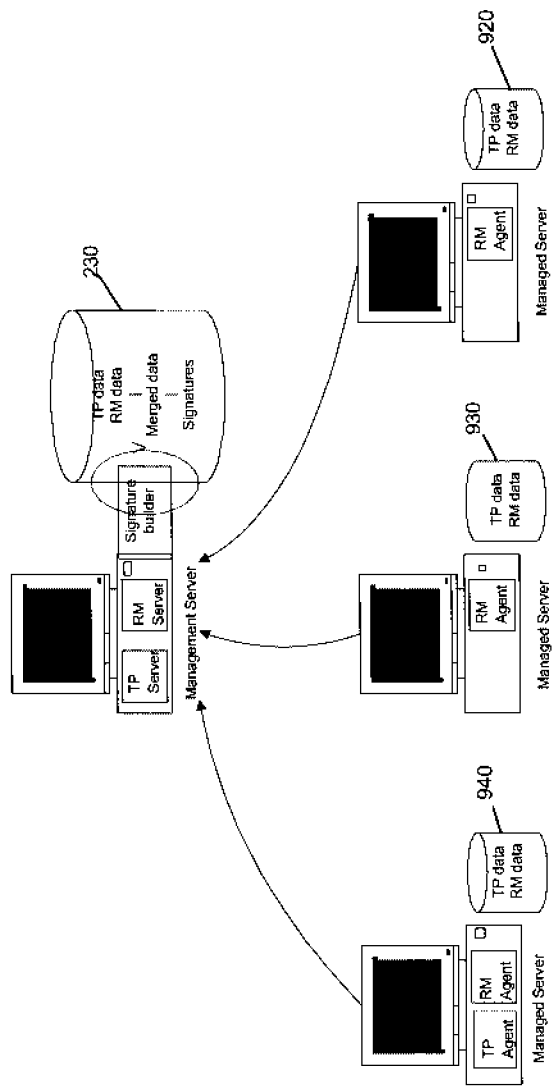
FIG. 10 illustrates a system environment for operating the method of the preferred embodiment in production mode.

FIG. 10 illustrates a system environment for operating the method of the preferred embodiment in production mode. This FIG. 10 shows the TP agent running on only one managed server. This configuration is appropriate where all management servers process the same transactions and are very similar in all respects (they form a cluster of a HTTP server). The 'training' can be ongoing with the training overhead limited to a single server. Even though the signatures are being built from the information collected on only one server, the servers are so similar that the signatures produced are applicable to all.

The invention may be implemented as a service offering. The use of resource monitoring tools is very diffuse, and most enterprise customers will be using one to do traditional resource health/availability monitoring. The use of transaction monitoring tools is much less diffuse, even though the performance of transactions directly impacts the end-user and can directly affect the business being conducted. A services offering could be the production of resource monitoring signatures that will detect situations of degraded response time without requiring additional software to be purchased by the customer. These signatures are tuned to the customer's systems, as they would be produced from data collected during a training period in the customer's environment.

The services team would install a transaction monitor server in the customer's system, or bring one pre-loaded on a services team-owned system, install a TP agent on the customer's managed servers, and initiate the collection of data. After enough data has been collected, the services team would run the analysis code and build the signatures that would then be delivered to the customer for deployment to the resource monitor agent.

Figure 11:
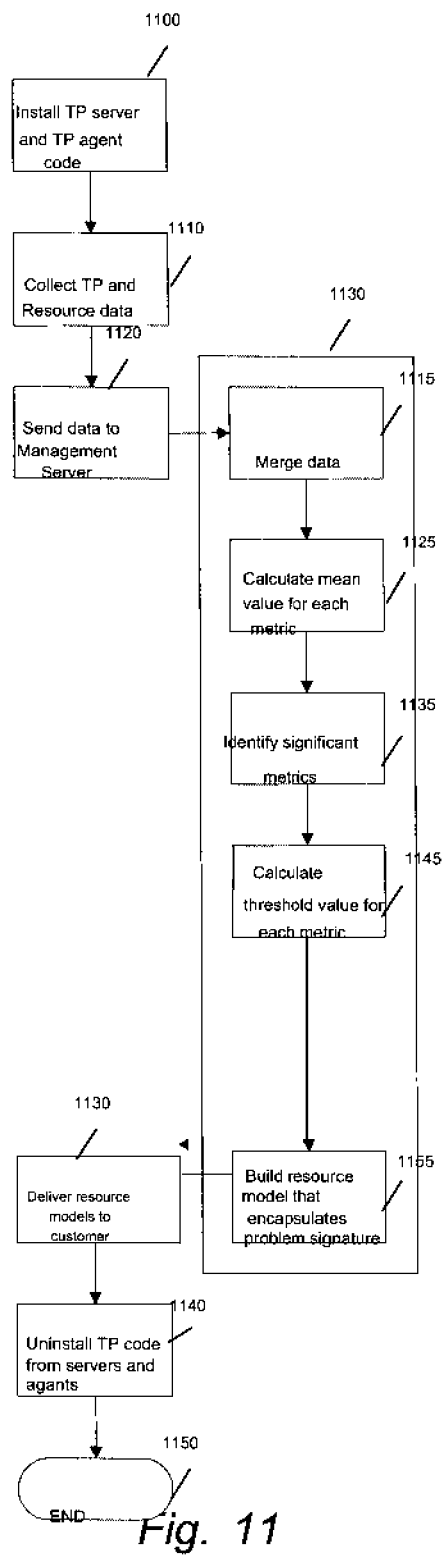
FIG. 11 is the general flow chart of the method of the preferred embodiment when implemented as a service offering.

FIG. 11 is the general flow chart of the method of the preferred embodiment when implemented as a service offering. The TP agent are first installed (1100) on the servers to be monitored. Then, TP and RM data are collected (1110) from monitored servers. The data are then sent (1120) by the agents to the Management server. The following steps (1130) are performed in the Management server. The data from TP and RM agents are merged (1115) in the Monitoring database. The Correlator contained in both the TP and RM records are used to correlate the related information. For each metric, the mean value is calculated (1125). The significant metrics are identified (1135). Metrics that are consistently different in 'normal' and 'exception' records are identified because they contribute to the problem signature. For each metric the threshold value is computed (1145). The 'best' value is calculated using an arbitrarily algorithm or, alternatively, by allowing customer selection. A resource model that encapsulates problem signature is built (1155). The resource model is then deployed to the customers (1130). If the user of the web service desires going on the period of training to identify problems, the data is collected again and the same loop is performed. If the user has no more need of this service, this is the end of the method. Training can be carried out for a certain period of time and then the TP agent is removed (1140) the monitoring method ends (1150) and the signatures produced are used by the resource monitoring agent. Alternatively, training can be ongoing and the signatures are continually updated with recent data. This latter approach is appropriate if a TP agent can be left active on a subset of managed servers.

The invention claimed is:

1. A method for monitoring transaction based systems having a system resource monitor and a transaction performance monitor, said method comprising the steps of:
   periodically collecting on a time period basis, system resource metrics values using the system resource monitor and transaction performance metrics values using the transaction performance monitor, the system resource metrics pertaining to information technology resources (IT resources) consumed in operating a data processing system;
   detecting using the system resource monitor when the system resource metric threshold value is exceeded;
   detecting using the transaction performance monitor when the transaction performance metrics threshold value is exceeded;
   triggering, from the transaction performance monitor, the system resource monitor for additionally collecting system resource metrics values each time a transaction performance metric threshold value is exceeded outside of a time period;
   calculating, for a number of time periods, the mean value of each periodically collected system resource metrics values;
   calculating, for the same number of time periods, the mean value of each additionally collected system resource metrics values;
   identifying the system resource metrics for which there is a greater than specified difference between mean value obtained with additional collections of system resource metrics values and mean value obtained with collections of system resource metrics values done on period of time basis; and
   setting new threshold values between the two calculated mean values for the identified system resource metrics.

2. The method of claim 1, wherein
   the triggering step further comprises the transaction performance monitor itself performing, each time a transaction performance metric threshold value is exceeded, an additional collection of transaction performance metric values including an identifier of said additional collection, this identifier being provided to the system performance monitor to be included in the system monitor additional collection of metric values; and
   the calculating steps further comprise calculating, for a number of time periods, the mean value of transaction performance metrics values.

3. The method of claim 1 further comprising the steps of:
   using the new threshold values for system monitoring; and
   repeating all the steps of the method as many times as necessary until the monitoring of system is satisfying.

4. A service offering method for monitoring from a manager server transaction based servers able to monitor locally their system resource and transaction performance, said system comprising:
   locally installing on managed servers the system resource and transaction performance monitoring tools;
   locally periodically collecting on a time period basis, system resource metrics values using the system resource monitor and transaction performance metrics values using the transaction performance monitor, the system resource metrics pertaining to information technology resources (IT resources) consumed in operating a data processing system;

detecting using the system resource monitor when the system resource metric threshold value is exceeded;

detecting using the transaction performance monitor when the transaction performance metrics threshold value is exceeded;

locally triggering on managed servers, from the transaction performance monitor, the system resource monitor for additionally collecting system resource metrics values each time a transaction performance metric threshold value is exceeded outside of a time period;

sending data including periodically collected and additionally collected system resource metrics values from the managed servers to the manager server;

calculating on the manager server, for a number of time periods, the mean value of each periodically collected system resource metrics values;

calculating on the manager server, for the same number of time periods, the mean value of each additionally collected system resource metrics values;

identifying on the manager server the system resource metrics for which there is a greater than specified difference between mean value obtained with additional collections of system resource metrics values and mean value obtained with collections of system resource metrics values done on period of time basis;

setting new threshold values between the two calculated mean values for the identified system resource metrics; and sending new threshold values of system resource metrics from the manager server to the managed servers.

5. The method of claim 4, wherein
the triggering step further comprises the transaction performance monitor itself performing, each time a transaction performance metric threshold value is exceeded, an additional collection of transaction performance metric values including an identifier of said additional collection, this identifier being provided to the system performance monitor to be included in the system monitor additional collection of metric values; and
the calculating steps further comprise calculating, for a number of time periods, the mean value of transaction performance metrics values.

6. The method of claim 4 further comprising the step of:
using locally on the managed servers the calculated threshold for system monitoring;
repeating all the steps of the method starting from the collecting step as many times as necessary until the monitoring of system resource is satisfying; and
locally un-installing on managed servers the transaction performance data monitoring tool.

7. A computer program product in a non-transitive computer readable storage medium for monitoring transaction based systems having a system resource monitor and a transaction performance monitor, when said program is executed on a computer said program executing a method comprising the steps of:
periodically collecting on a time period basis, system resource metrics values using the system resource monitor and transaction performance metrics values using the transaction performance monitor, the system resource metrics pertaining to information technology resources (IT resources) consumed in operating a data processing system;
detecting using the system resource monitor when the system resource metric threshold value is exceeded;
detecting using the transaction performance monitor when the transaction performance metrics threshold value is exceeded;
triggering, from the transaction performance monitor, the system resource monitor for additionally collecting system resource metrics values each time a transaction performance metric threshold value is exceeded outside of a time period;
calculating, for a number of time periods, the mean value of each periodically collected system resource metrics values;
calculating, for the same number of time periods, the mean value of each additionally collected system resource metrics values;
identifying the system resource metrics for which there is a greater than specified difference between mean value obtained with additional collections of system resource metrics values and mean value obtained with collections of system resource metrics values done on period of time basis; and
setting new threshold values between the two calculated mean values for the identified system resource metrics.

8. The computer program product of claim 7, wherein
the triggering step further comprises the transaction performance monitor itself performing, each time a transaction performance metric threshold value is exceeded, an additional collection of transaction performance metric values including an identifier of said additional collection, this identifier being provided to the system performance monitor to be included in the system monitor additional collection of metric values; and
the calculating steps further comprise calculating, for a number of time periods, the mean value of transaction performance metrics values.

9. The computer program product of claim 7, further comprising the steps of:
using the new threshold values for system monitoring; and
repeating all the steps of the method as many times as necessary until the monitoring of system is satisfying.

10. A system including processor and memory for monitoring transaction based systems having a system resource monitor and a transaction performance monitor, said system comprising:
a processor;
a memory coupled to the processor for storing instruction of a computer program product which when executed by the processor perform the method comprising:
periodically collecting on a time period basis, system resource metrics values using the system resource monitor and transaction performance metrics values using the transaction performance monitor, the system resource metrics pertaining to information technology resources (IT resources) consumed in operating a data processing system;
detecting using the system resource monitor when the system resource metric threshold value is exceeded;
detecting using the transaction performance monitor when the transaction performance metrics threshold value is exceeded;
triggering, from the transaction performance monitor, the system resource monitor for additionally collecting system resource metrics values each time a transaction performance metric threshold value is exceeded outside of a time period;
calculating, for a number of time periods, the mean value of each periodically collected system resource metrics values;

calculating, for the same number of time periods, the mean value of each additionally collected system resource metrics values;

identifying the system resource metrics for which there is a greater than specified difference between mean value obtained with additional collections of system resource metrics values and mean value obtained with collections of system resource metrics values done on period of time basis; and setting new threshold values between the two calculated mean values for the identified system resource metrics.

11. The system of claim 10, further comprising the steps of:

using the new threshold values for system monitoring; and repeating all the steps of the method as many times as necessary until the monitoring of system is satisfying.

12. The system of claim 10, wherein the triggering step further comprises the transaction performance monitor itself performing, each time a transaction performance metric threshold value is exceeded, an additional collection of transaction performance metric values including an identifier of said additional collection, this identifier being provided to the system performance monitor to be included in the system monitor additional collection of metric values; and the calculating steps further comprise calculating, for a number of time periods, the mean value of transaction performance metrics values.

\* \* \* \* \*